March 31, 1925. 1,531,744
F. C. FARNSWORTH
STEAM DRYING SYSTEM
Filed Sept. 28, 1920
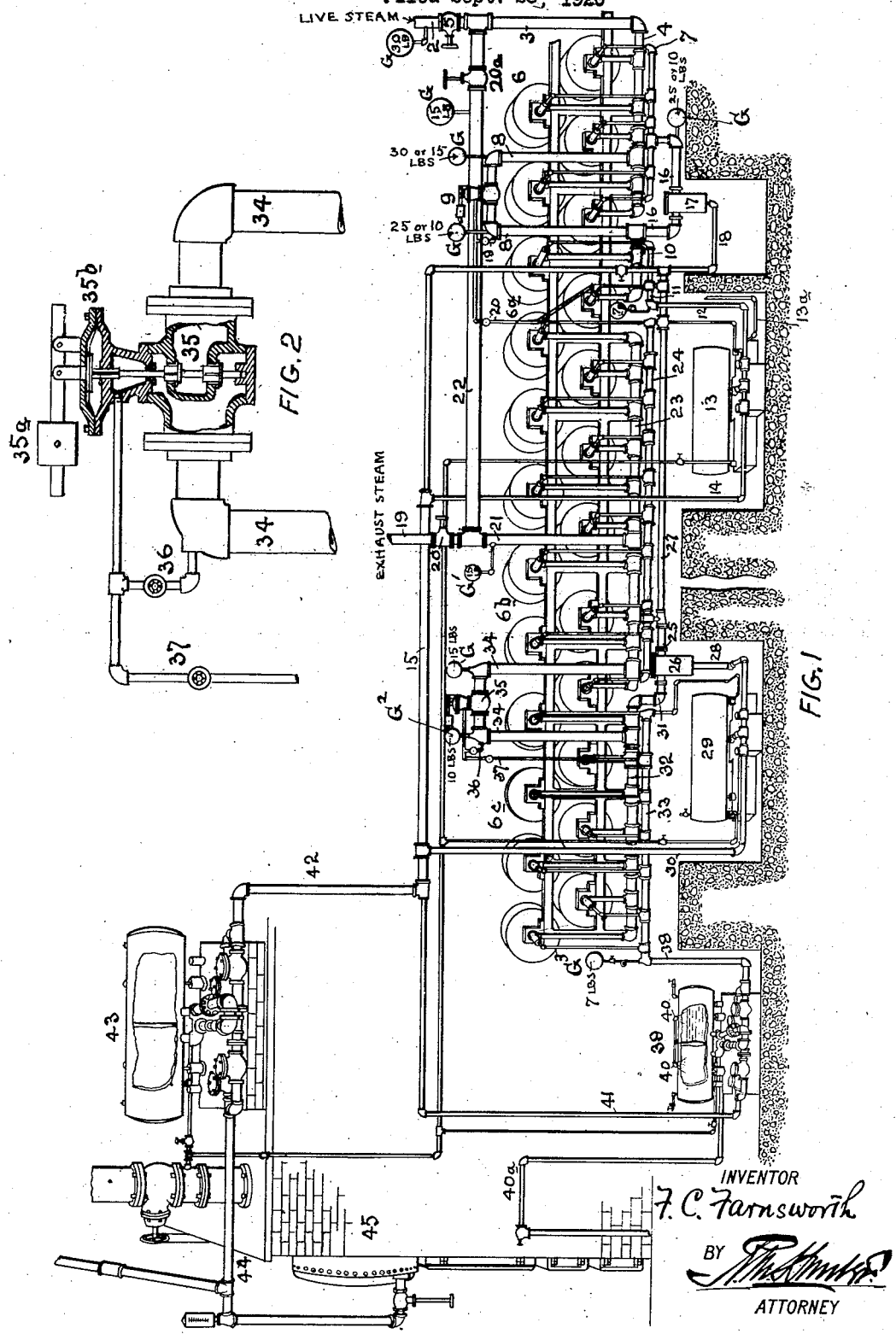
INVENTOR
F. C. Farnsworth
BY
ATTORNEY Patented Mar. 31, 1925.

1,531,744

UNITED STATES PATENT OFFICE.

FREDERICK C. FARNSWORTH, OF NORRISTOWN, PENNSYLVANIA.

STEAM DRYING SYSTEM.

Application filed September 28, 1920. Serial No. 413,421.

*To all whom it may concern:*

Be it known that I, FREDERICK C. FARNSWORTH, a citizen of the United States, and resident of Norristown, county of Montgomery, and State of Pennsylvania, have invented an Improvement in Steam Drying Systems, of which the following is a specification.

The object of my invention is to provide a method and means for utilization of steam for drying in paper making machines, whereby high efficiency is attained and all heat units not consumed in the drying operation are returned to the boiler with the return water of condensation, said condensation constituting feed water to the boiler equipment.

This invention relates to a system of drying employed in paper mill machinery and utilizing live or exhaust steam for heating the drying cylinders, the said cylinders being arranged in sections known as a dry end section and a wet end section, the steam delivered from the dry end section being separated from the water of condensation and delivered to the wet end section in which it is usually condensed and the water of condensation and any escaping vapors discharged to the sewer. The main or distinctive feature of my improvement in the preferred form resides in circulating of the steam through all of the drying cylinders at a pressure above atmospheric pressure and insuring free flow of the steam entirely through the system by causing the steam after passing from the wet end drying cylinders to be condensed in a continuous manner to remove all back pressure, and at the same time utilizing the local vacuum produced thereby to cause the water of condensation to be rapidly removed from the discharge side of the drying cylinders, whereby the water is collected and removed and the steam is caused to flow freely through all of the drying cylinders.

My object, is further to provide a substantially constant predetermined heating condition at all times in the paper making machine, whereby the drying cylinders on the dry end are hottest and the temperature gradually decreases as the wet end is approached, the circulation through all of the drying cylinders being done at pressures above atmospheric pressure and said pressure decreasing from the dry end to the wet end, from which latter the air, water and steam are removed.

More particularly, my object is to operate the drying cylinders in sections, and where there are two sections, viz: the dry end section formed by approximately seventy-five per cent of the dryers, as related to twenty-five per cent of the dryers on the wet end section, the latter section is supplied with the uncondensed steam, which has passed through the dry end cylinders accompanied by water of condensation and air, the water of condensation formed in the dry end section being automatically separated from the steam before it reaches the wet end section and at all times retained under pressure to maintain its temperature, prior to its return to the boiler as feed water; and further, the object is to cause the steam from the dry end sections to pass into and through the wet end cylinders and partly condense, the remaining uncondensed steam being utilized in an automatic duplex condensation pump or other pumping device for creating and maintaining a partial vacuum, utilized to directly act to suck the water and air from the wet end cylinder and returns, removing all back pressure from steam and delivering the hot condensation water to the boiler feeder with a minimum loss of heat units.

As a further object of my invention, I provide a communication between the steam supply to the dry end section and supply to the wet end section, in which is arranged automatic pressure reducing valve devices adapted to insure additional steam (preferably from the same source as supplies the dry end section) to the wet end section when insufficient steam is passing through the dry end section to meet the duty requirements of the wet end section of drying cylinders, such for example, as when insufficient initial steam pressure is available or when the stock being dried is extra thick and wet and hence requiring more steam in the dryers without impairing the function of the duplex or other condensing pump as a vacuum producing means for taking care of the water of condensation and insuring circulation.

As a further improvement in my improved system, the dry end section of the drying cylinders is extended and divided as a final operating unit for specially meeting the heavy duty in drying paper "board" as distinguished from the necessities incident to drying of thin papers in web form. My object in this part of my invention is to increase the number of drying cylinders and supply them with exhaust or live steam, as may be convenient or necessary, and whereby it is possible to supply live steam of higher pressures in the divided extension of the drying cylinders than those employed in the dry end section next adjacent to the wet end section, with the result that the paper "board" is subjected to the heat of gradually increased steam pressures to insure proper drying, or on the other hand, to supply the extended sections with exhaust steam of the same pressure as supplied to the dry end section next to the wet end section. It is further my object, in embodying these extended sections of drying cylinders to provide automatic pressure reducing means for said sections and also to provide a condensation pump having capacity for creating a partial vacuum within itself to remove back pressure and to induce steam circulation in the drying cylinders above atmospheric pressure; and at the same time to deliver the hot condensation water to the boilers, all as hereinbefore stated with respect to the wet end of the system, with the exception that in this case the water of condensation received from the final section may be forced by the steam pressure to the boiler and delivered therein by a duplex boiler feeder.

By reason of the carrying out of the above stated objects and results, I am enabled to provide drying capacity to suit all characters of work and duty; and at the same time, heat units available in the water of condensation and in the steam condensed in or in connection with the pumps used for handling the water and for maintaining the partial vacuum desired, may be all returned to the boiler as elements of the feed water and whereby the system as a whole is operated under high efficiency.

With the above and other objects hereinafter set out, my invention consists in the method and means for securing the desired results and comprising the features hereinafter described and more particularly defined in the claims.

Referring to the drawings: Fig. 1 is a general side elevation of a drying apparatus of a paper making mill embodying my improvements; and Fig. 2 is a sectional elevation of the pressure reducing valve devices for automatically by-passing steam from the supply of one drying section to the supply of the next drying section in advance.

Considering first, the wet end divisions comprising the wet end section 6$^c$ and dry end section 6$^b$ the source of steam supply may be the exhaust steam pipe 19 from which steam is admitted to pipe 21 by valve 20 and thereby supplied to the steam header 23 from which it is delivered to the drying cylinders of section 6$^b$. The pressure of this exhaust steam may be assumed to be fifteen pounds as indicated by gauge G' on pipe 21. The water of condensation, air and uncondensed steam from the drying cylinders are delivered into a return header 24 which drains into a horizontal pipe 27 discharging into a steam separator 26. From the separator the water of condensation drains by pipe 28 and enters the condensation pump 29 (to be later described) and by which the water is delivered, under pressure, by pipe 30 to the mains 15 and 42 to the duplex boiler feeder 43 (to be later described) and from which it is delivered by pipe 44 into the boiler 45.

The steam leaving the separator 26 passes by elbows 31 into the supply header 32 for the cylinders of the wet end section 6$^c$; and the steam may be assumed as of ten pounds pressure, as indicated on one of the gauges G$^2$. This steam, thus received from the returns of the dry end section 6$^b$, is supplied under its initial pressure through the drying cylinders of the wet end section 6$^a$ and the water of condensation and air released therein are discharged into the return header 33 at a reduced pressure which may be assumed as seven pounds, as indicated on the gauge G$^3$ connected with said return header. The water and air blown from the wet end cylinders into the return header, pass by pipe 38 to the suction inlet of the duplex condensation pump 39 (to be later described) having the cold water spray jets 40 by which it condenses the steam and creates and maintains a partial vacuum, the condensation of the steam and thereby removal of the back pressure, permitting the free flow of the steam through the dryers at a pressure above atmospheric pressure. The water of condensation blown from the dryer cylinders and received by this pump 39, is forced under pressure through pipes 41 and 42 into the duplex boiler feeder 43 and delivered to the boiler 45. The cold water for spray condensation is supplied by a pipe 40$^a$. It will be specially noted that the steam is circulated through all of the dryer cylinders at a pressure above atmospheric pressure so that at no time is there a deficiency in steam to the wet end section 6$^c$. In some cases as in "board mills" the pressure of the steam in the wet end section may be as high as twenty-five pounds thereby providing a heating source having high termperature where it is most needed. The vacuum creating means 39 for exhausting the air and water is separate from the wet end dryers, and in aiding the circulation of steam through them by condensing the steam reaching it, said means indirectly aids in removing the air and water from the dry end section 6^b and facilitating the steam circulation therein.

In cases where there is an insufficient supply of steam passing from the returns 24 of the dry end section 6^b, through separator 26 to the wet end section 6^c, it is necessary to supply steam direct from the supply header 23 of section 6^b to supply header 32 of section 6^c, and this is accomplished automatically by the following means. The headers 23 and 32 are connected by an arch pipe 34 containing at its upper end a pressure reducing valve 35 (more clearly shown in Fig. 2) which may be set to maintain the steam pressure in the wet end header 32 at a predetermined amount governed by the pressure in the wet end section, and this may be set to respond to fluctuations in the supply header 32 or return header 33, as desired. The pressure reducing valve 35 is operated to open by the action of a counterweight 35^a and to close under the pressure supplied from the wet end section acting upon the diaphragm 35^b, the said pressure supplied by a valve controlled pipe 36 from the supply header 32, or by a valve controlled pipe 37 from the return header 33. By this arrangement, when the weight 35^a is once set for control by the variations in steam pressure in the supply header 32, if, for any reason, there was insufficient steam to meet sudden increase of moisture in the paper, the engineer will close pipe 36 and open pipe 37, said action instantly causing an increased automatic steam supply through the pressure reducing valve 35 to the wet end section 6^c of the dryers. If the steam supply should be in excess of the requirements (shown by the gauge G^3 on return header 33) the pipe 37 is closed and pipe 36 is opened. In this manner the apparatus has a capacity under the control of the engineer for quick change of steam supply when necessary and at other times the regulation is automatic. In case of special emergency, the engineer may close both pipes 36 and 37 allowing the valve 35 to open full or to close one pipe and throttle the other to provide for further regulation of valve 35 where a somewhat greater opening than normal is required. The object in all cases should be to provide as free circulation of steam as possible with a sufficient final pressure above atmospheric pressure in the wet end return as will blow the driers clear of water and air, the steam passing to the duplex condensation pump 39 where it is condensed, the heat units thus absorbed into the spray water being fully returned to the boiler and thus doubly utilized. Steam gages G are shown at various other places of the apparatus with approximate suitable pressures indicated by way of example.

The system above described in detail, is efficient in ordinary paper making mills where paper is being manufactured as distinguished from "paper board"; and it is here pointed out, that as many drying cylinders as desired may be employed in the several sections and either exhaust or live steam, or both, may be used as the source of heat. It is customary to employ seventy-five per cent of the total number of drying cylinders in the dry end section as compared with twenty-five per cent in the wet end section, but this is by way of example and not as a restriction, the smallness of the drawing precluding the actual showing of the preferred full number of cylinders.

Where the paper mill is intended for making "paper board", wherein the material to be dried is greatly increased in bulk, it is desirable to increase the number of dry end sections, to not only provide more drying surface but also to supply more steam to the wet end section. I have shown in Fig. 1 a satisfactory construction for providing increased heating surface and dry end sections, the same comprising cylinder sections 6^a and 6. Cylinders of section 6^t are supplied with steam from a supply header 4 receiving exhaust steam by pipe 22 under control of valve 20^a, or live steam from steam main 2 under control of valve 5. The water of condensation and uncondensed steam from the cylinders of section 6 discharge into the return header 7, passing therefrom by pipe 16 in which is arranged a steam separator 17 from which the water passes by pipe 18 to the return pipe 27, communicating with pipe 25 and ultimately delivering into the condensation pump 29. The steam from the separator 17 passes by a continuation of pipe 16 into a supply header 10, which supplies steam to the cylinders of section 6^a, the water of condensation and steam therefrom passing to return header 11 and thence by pipe 12 to the suction port of a vacuum condensation pump 13, supplied with spray water by pipe 13^a and capable of condensing a portion of the steam and by removing back pressure, permitting free circulation. The discharge from this pump 13 is delivered by pipe 14 into the main 15 leading to the duplex boiler feeder 43 before referred to. The steam pressure in sections 6 and 6^a, if from exhaust, may be 15 pounds in supply header 4, 10 pounds in return header 7 and supply header 10, and 7 pounds in return header 11. If higher pressure from live steam is required (where the paper board is thick), the respective pressures may be correspondingly increased to 30, 25 and 15 pounds.

As in the case of sections 6ᵇ and 6ᶜ, the respective supply headers 4 and 10 of sections 6 and 6ᵃ may be connected by a by-pass pipe 8 containing a pressure reducing valve 9 constructed and operating in all material respects similarly to reducing valve 35 employed between sections 6ᵇ and 6ᶜ. Also, this reducing valve may be connected by pipes 19 and 20, respectively, with the supply and return headers of section 6ᵃ, and operate to automatically supply a sufficient quantity of steam to section 6ᵃ to meet drying requirements. It will be observed that sections 6 and 6ᵃ are constructed and operate very similarly to sections 6ᵇ and 6ᶜ, except that in the latter case condensation pump 29 is required to take care of the water of condensation from section 6ᵇ and in part from sections 6 and 6ᵃ, whereas in the case of sections 6 and 6ᵃ the vacuum condensation pump 13 is relied upon to remove the main water and air and condense a part of the steam to improve steam circulation in these sections, and a higher steam pressure may be supplied if so desired.

In referring to the various pumping devices 13, 29 and 39, and the boiler feeder 43, I have considered these devices as well known types which have been heretofore developed by me and are extensively in general use in other systems and it will therefore be only necessary to briefly define the characteristics of these parts of the general apparatus of my present invention. The boiler feeder 43 is of the type in which there is a tilting tank having two compartments, one filling with the feed water against atmospheric pressure, while the other is discharging by gravity into the boiler, accomplished by admitting steam at boiler pressure to the compartment, the control of the discharge being governed by the tilting of the tank under the filling and discharging operations. The duplex condensing pump 39 essentially comprises a tilting tank having two compartments alternately receiving water of condensation and alternately discharging to the boiler feeder under the boiler steam pressure, the steam thus supplied and utilized, together with that from the wet end cylinders being then condensed by water sprays to provide a partial vacuum in the compartments alternately and thus maintain a vacuum and resulting suction upon the water and air in the return pipes of the drying section. The tilting tank condensation pumps 13 and 29 are ordinarily single acting devices discharging intermittently and in the case of pump 13, it is made to produce a partial vacuum by the employment of the spray water supply 13ᵃ, the vacuum produced operating to improve circulation of steam through the sections 6 and 6ᵃ and in a measure simulating the action of pump 39, though in a lesser degree in view of the fact that it is not at the wet end of the system.

While I prefer the tilting trap pumps as a means for handling the water of condensation and condensing the steam to insure circulation of steam in the wet end cylinders above atmospheric pressure, an ordinary vacuum pump with condensing water spray may be used instead; and similarly, aside from handling the water and air and for return of the water to the boiler, any means suitable for condensing the steam passing from the wet end return header 33 may be employed as, for instance, a feed water heater.

It will be understood that none of the drying cylinders are required to provide a vacuum in maintained condition, and it is upon the duplex vacuum condensation pump 39 or its equivalent that most reliance is placed to insure positive circulation of the steam through sections 6ᵇ and 6ᶜ, though the steam circulates, through all the dryers at a pressure above that of the atmosphere. In a similar manner, the pump 13 operates to provide a partial vacuum to insure circulation of the steam in dryer sections 6 and 6ᵃ at a pressure above that of the atmosphere.

By my improved construction and mode of operation, I obtain economy in the use of steam, insure perfect circulation of the steam above atmospheric pressure and effective drying thereby, and have capacity for regulation of the volume of steam at definite pressures to be supplied to the steam.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having thus described my invention, what I claim as new and desire to secure by Letters Patent, is:—

1. A drying apparatus for paper making machines having drying cylinders arranged in a plurality of sets constituting sections operating under different predetermined pressures, each section provided with supply and return headers in which the supply header of one section is connected with a source of steam and the return header of said section is connected to deliver its steam into the supply header of the next section of lower pressure, combined with a receiving device for removing the air and water of condensation from said section of lower pressure, a by-pass for supplying steam from the supply header of the first mentioned section to the supply header to the section of lower pressure, and automatic means in the by-pass for controlling the passage of steam therein whereby a predetermined differential pressure between the pressures in the two supply headers may be maintained.

2. The invention according to claim 1, further characterized by having the two sections constitute a dry end section and a wet end section, and having the receiving device connected to the wet end section and steam is utilized therein with cold water spray for producing the condensation of the steam and a local vacuum, whereby the water of condensation and steam are delivered from the wet end section and steam at or above atmospheric pressure caused to circulate through the same, and said live steam utilized for discharging the water of condensation from the receiving device to the place of delivery.

3. The invention according to claim 1, further having means for receiving and discharging the water of condensation from the dry end return header, said means consisting of a tilting condensation pump whose operation removes the water of condensation and delivers it to the place of discharge and also supplies said water of condensation with the heat of additional steam condensed by contact therewith.

4. The invention according to claim 1, having further, the two sections constituting wet and dry end sections means for receiving and removing water of condensation from the return header of the dry end section, a by-pass for steam from the supply header of the dry end section to the supply header of the wet end section, and means in said by-pass for controlling the passage of steam.

5. The invention according to claim 1, wherein the means in the by-pass comprises an automatic pressure reducing valve for maintaining a general predetermined steam pressure in the section of lower pressure.

6. The invention according to claim 5, in which the reducing valve is provided with means for enabling it to operate to maintain a substantially constant steam pressure in the supply header of the lower pressure section.

7. The invention according to claim 5, in which the reducing valve is provided with means for enabling it to operate to maintain a substantially constant steam pressure in the return header of the wet end section.

8. The invention according to claim 5, wherein the reducing valve is combined with hand adjustable means for causing it to respond to the pressure of either the supply or return headers of the section of lower pressure to insure sufficient steam supply to compensate for variations in the drying duty required of the section.

9. The invention according to claim 8, in which the hand adjustable means for the pressure reducing valve comprise pipes leading from the pressure reducing valve and respectively communicate with the supply and return headers of the section of lower pressure, and said pipes each provided with a manually adjustable valve.

10. The invention according to claim 3, in which the section of higher pressure constitutes a dry end section and the section of lower pressure constitutes a wet end section, further combined with a steam boiler for supplying steam to the dry end section and also to the receiving devices of the wet end section and receiving means of the dry end section for handling the condensation water from the return headers of the wet and dry end sections, respectively, and a boiler feeding device for and receiving the heated water discharged from the receiving devices and means and delivering it into the boiler, whereby the heat units of the steam utilized in handling the water of condensation are automatically returned to the boiler.

11. The invention according to claim 1, further characterized by having the section of higher pressure supplemented by two additional sections of drying cylinders the said sections coupled in series so that the steam from the returns of the last section is supplied to the next section, means to supply steam at desired pressure to the last and most distant of said sections from the wet end section, and a condensation pumping means producing a partial vacuum therein for removing the water of condensation and insuring positive circulation of steam above atmospheric pressure in said additional sections.

12. The invention according to claim 11, further having a by-pass from the supply side of the last section to the supply side of the other of the additional dry end section, and valve devices in the by-pass to control the supply of steam.

13. The invention according to claim 12, wherein the valve devices in the by-pass between the two additional dry end sections are automatic and controlled by the varying pressures in the next to last dry end section.

14. The herein described method of drying paper which consists in supplying steam from a source to the dry end section cylinders and delivering the uncondensed steam therefrom to the wet end section cylinders while maintaining the said steam pressures above atmospheric pressure, removing the water of condensation from said dry and wet end sections and delivering it to the source of steam, and producing a partial vacuum at a place beyond the wet end section and between it and the source of steam for causing the water of condensation from the wet end section to be freely driven from the cylinders and also the return piping thereof and permitting the steam to rapidly circulate therein at low pressure but above atmospheric pressure.

15. The method of drying paper, consisting in passing the wet paper successively over a plurality of drying cylinders arranged in sets comprising dry end and wet end sections, supplying steam to the dry end cylinders to heat them, passing the uncondensed steam from the dry end cylinders into the wet end cylinders for heating them, removing the water of condensation from the cylinders, supplying steam from the source directly to the cylinders of the wet end section without passing through the cylinders of the dry end section, and regulating the supply of steam thus supplied from the source directly to the wet end section under control of the steam pressure variations in the wet end section to maintain a substantially constant predetermined differential pressure between the wet end and dry end sections.

16. The invention according to claim 15, further characterized by causing the regulation of the direct supply of steam to the wet end section to be governed by the pressure in the supply header or return header thereof, at the will of the engineer.

17. The method of drying paper, consisting in passing the wet paper web successively over a plurality of drying cylinders arranged in sets comprising dry end and wet end sections, supplying steam to the dry end cylinders to heat them, passing the uncondensed steam from the dry end cylinders into the wet end cylinders for heating them, passing water of condensation and uncondensed steam from the wet end cylinders at a pressure above atmospheric pressure, condensing the steam after passing from and out of the influence of the wet end cylinders to remove back pressure and to permit the steam to flow through all of the cylinders at a pressure above atmospheric pressure and to blow the water of condensation from said cylinders with a minimum resistance.

18. The method of drying paper, consisting in passing the wet paper web successively over a plurality of heated drying cylinders arranged in sets including dry end and wet end sections, supplying steam to the dry end section and the steam received from the cylinders of that section into the cylinders of the next section of lower pressure, removing the water of condensation and air from the last mentioned section to permit the steam to pass freely into the cylinders thereof, and maintaining a predetermined differential in pressure between the steam supply pressures of the adjacent sections by causing steam to be directly by-passed from the supply main of any one section to the supply main of the next section of lower pressure, said by-passing of the steam for regulation and maintenance of the predetermined differential being in the direction from the dry end section to the wet end section.

19. The method according to claim 18, wherein further, the by-passing of the steam is controlled by a drop in the pressure in the steam supply of any section to such an extent as to make the differential in pressures between the pressure of the steam supply in which the drop occurred and the steam supply pressure to the section from which the steam was derived greater than the predetermined differential.

In testimony of which invention, I hereunto set my hand.

FREDERICK C. FARNSWORTH.